United States Patent

Waddell

[11] 4,020,517
[45] May 3, 1977

[54] DOCKBOARD

[76] Inventor: Robert E. Waddell, P.O. Box 4174, Charlotte, N.C. 28204

[22] Filed: Feb. 26, 1976

[21] Appl. No.: 661,526

[52] U.S. Cl. .................................. 14/71.5
[51] Int. Cl.$^2$ ............................. E01D 1/00
[58] Field of Search .............. 14/71 R, 71 M, 71 H

[56] References Cited

UNITED STATES PATENTS

| | | | |
|---|---|---|---|
| 2,626,411 | 1/1953 | Palmer | 14/71 H |
| 2,639,450 | 5/1953 | Ramer | 14/71 H |
| 2,974,336 | 3/1961 | Kelley | 14/71 M |
| 3,018,496 | 1/1962 | Hosbein | 14/71 H |
| 3,334,368 | 8/1967 | McIntosh | 14/71 M |
| 3,456,284 | 7/1969 | McGuire | 14/71 H |
| 3,493,984 | 2/1970 | Reinhard | 14/71 M |
| 3,840,930 | 10/1974 | Waddell | 14/71 M |

Primary Examiner—Nile G. Byers
Attorney, Agent, or Firm—Richards, Shefte & Pinckney

[57] ABSTRACT

A dockboard for use on a loading dock to provide a ramp between the dock and a platform of an adjacent vehicle, the dockboard being of the type that has a dock plate movable between a flat disposition on the surface of the dock to an inclined loading or unloading position. The dock plate is supported on a transverse cross bar adjacent the outer edge thereof with pairs of downwardly projecting arms secured to the dock plate and straddling the cross bar for support of the dock plate thereon while allowing relative movement therebetween to accommodate slight vertical or tilting movement of the dock plate to conform with the bed of an adjacent vehicle during unloading or loading and also to permit easy removal of the dock plate from the cross bar. The cross bar is supported by a pair of vertical posts mounted in guide channels to restrict movement of the cross bar and outer edge of the dock plate in a generally vertical direction with the inner end of the dock plate being free to slide on the dock surface. Toe guard plates are hinged to the side edges of the dock plate and extend laterally therefrom for pivoting from flat dispostions with the dock plate on the dock surface to laterally inclined dispositions in edge contact with the dock when the dock plate is in an inclined loading or unloadng disposition, thereby obstructing access laterally to the space between the dock plate and dock.

19 Claims, 15 Drawing Figures

DOCKBOARD

BACKGROUND OF THE INVENTION

The present invention is directed to a dockboard and more particularly to a dockboard of the type that is mounted on a dock for movement between a flat disposition on the dock and an inclined loading or unloading disposition.

A typical example of a dockbord of this general type is disclosed in Waddell U.S. Pat. No. 3,840,930, issued Oct. 15, 1974, for Dockboard. In this and in some of the other types of dockboards there is an open space between the raised disposition of the side edges of the dockboard and the surface of the dock, which is a potentially hazardous condition in the event an operator or bystander happens to have his toe or foot in the space when the dockboard is being lowered. In dockboards of the type mounted in recesses in the dock it is possible to provide vertical side panels to obstruct this open space, but with dockboards mounted flat on an unrecessed dock surface such vertical side panels are impossible, and even in the recess mounted dockboards the vertical side panels can be undesirable where the depth of the recess to accommodate the side panels is otherwise not necessary or desired.

Also, in most dockboards the dock plate is attached to and manipulated by supporting elements that are pivoted to the dock plate for movement therewith without freedom of the dock plate to accommodate slight relative movement during raising and lowering thereof between flat and inclined dispositions.

Further, in most dockboards a truck plate is hinged to the outer edge of the dock plate and may be manipulated from an inoperative vertical hanging disposition to a horizontal operative disposition by a mechanism that is connected to the truck plate and remains connected when the dock plate is in use.

By the present invention toe guard plates are uniquely incorporated in a dockboard of the type of the aforesaid patent or of various other types to obstruct access to the spaces between the side edges of the dockboard and the dock and are positioned for sliding on the dock to a flat disposition when the dockboard is lowered. This invention also includes a unique means for hingedly mounting the dock plate on the supporting elements to accommodate slight shifting of the dock plate with the bed of an adjacent vehicle during unloading or loading and to permit easy removal of the dock plate from the supporting elements. In addition, the present invention provides a mechanism for pivoting the truck plate to its operative position, with the mechanism being retractable away from the truck plate to allow movement of the truck plate with the vehicle bed without damage to or restraint by the mechanism.

SUMMARY OF THE INVENTION

Briefly described, the dockboard of the present invention is arranged for use on a loading dock to provide a ramp between the dock and the platform of an adjacent vehicle. It includes a dock plate that has an outer edge disposed generally along the edge of the dock, an inner edge spaced from the dock edge, and side edges extending between the outer and inner edges. The dock plate is movable between a generally flat disposition at a level of the dock and an inclined disposition at which the outer edge is raised to a vehicle loading or unloading level and the inner edge is at the dock level. Toe guard plates are hinged to the side edges of the dock plate and extend laterally therefrom for pivoting in relation thereto between a flat disposition on the dock when the dock plate is flat and a laterally inclined disposition maintaining edge contact with the dock when the dock plate is in an inclined loading or unloading disposition, thereby obstructing access laterally to the vertical space between the dock plate and dock.

Preferably the toe guard plates have laterally outward dock contacting edged diverging forwardly away from the dock plate along at least portions of lines that extend angularly from approximately the inner ends of the side edges of the dock to maintain edge contact with the dock when the dock plate is in an inclined loading or unloading disposition. Further, the toe guard plates are hinged for edge sliding contact with the dock during at least a portion of the movement of the dock plate, with the pivoting being limited, preferably by abutment of the inner edges of the toe guard plates against the side edges of the dock plate, to a downward inclination less than a vertical disposition, preferably approximately 45°, so that the toe guard plates will remain capable of outward sliding engagement with the dock upon lowering of the dock plate.

The present invention also includes means for supporting the dock plate, the means including a cross bar extending transversely under the dock plate adjacent the outer edge thereof and at least one pair of downwardly projecting arms secured to the underside of the dock plate and straddling the cross bar for support of the dock plate on the cross bar while allowing relative movement therebetween to accommodate slight vertical or tilting movement of the dock plate to conform with the bed of an adjacent vehicle during unloading or loading and to permit easy removal of the dock plate from the cross bar. Preferably, the supporting means confines movement of the cross bar to a generally vertical direction to maintain movement of the outer edge of the dock plate generally vertical, with the inner edge of the dock plate free to slide on the dock. This is preferably accomplished by vertical guide posts supporting the opposite ends of the cross bar and with the guide posts retained in vertical guide channels mounted on the dock below the surface thereof. Further, means are provided for moving the dock plate, including a vertically disposed cylinder-piston mechanism mounted on the dock below the surface thereof and secured to the cross bar to impart vertical movement to the dock plate through the cross bar. The piston-cylinder mechanism may be pivotally mounted to maintain proper operating alignment with the cross bar during movement thereof.

Included in the dockboard of the present invention is a truck plate hingedly secured to the outer edge of the dock plate for pivoting between a hanging generally vertical inoperative position and an outwardly extending generally horizontal operative position, and means are provided for engaging and pivoting the truck plate from its inoperative position to its operative position and being disengagable and retractable therefrom when the truck plate is supported in its operative position on an adjacent vehicle. Preferably, this truck plate engaging means is retractable inwardly to a position out of engagement with the truck plate when the truck plate is in its inoperable generally vertical position, and stop means are provided to prevent movement of the truck plate inwardly beyond its inoperative position against the retracted engaging means. Movement of the truck plate engagement by the engaging means may be controlled to be generally coaxial with the truck plate pivoting by a hinge link arm hingedly secured to the dock plate outer edge for depending pivotable support therefrom, and the engaging means preferably is a linearly extendable and retractable mechanism having one end pivotally secured to the hinge link arm, with the retracted position disposing the hinge link arm inwardly beyond a vertical disposition out of truck plate engagement. Yieldable means, such as a generally linearly acting coil spring, may be included for urging the aforesaid mechanism to its retracted position and yieldably retaining it thereat.

In the preferred embodiment the toe guard plate feature is combined with the arrangement for supporting the dock plate for vertical movement and with the retractable dock plate engaging and pivoting means, with the laterally outward edges of the toe guard plates as well as the inner edge of the dock plate being free to slide on the dock during dock plate manipulation and also during any slight vertical or tilting movement of the dockboard that may occur when the dockboard is supported on the bed of a vehicle during loading or unloading while the engaging means is retracted.

DESCRIPTION OF THE PREFERRED EMBODIMENT

In the preferred embodiment of the present invention, the dockboard 20 is of the type that is mounted flush on the top and front surfaces of a dock D without requiring any recessing of the dock to accommodate the dockboard components. This dockboard 20 includes a dock plate 21 that is disposed flat on the dock D when the dockboard 20 is not in use and is, therefore, unobstructing to cross traffic thereover, but is capable of being raised to an elevated inclined position to allow access to and from the bed of an adjacent vehicle for loading or unloading. This dock plate 21 may be of solid, heavy steel or of laminated sheets or of any suitable material and construction capable of supporting desired loads.

The dock plate 21 has an outer edge 22 disposed adjacent the edge E of the dock D so that the outer edge 22 will be close to an adjacent vehicle for loading and unloading. In the embodiment illustrated the outer edge 22 is disposed outward of the dock edge E to provide space for mounting of bumper frames 23 on the face of the dock D on both sides of the dock plate 21, with the dock plate outer edge 22 being near the outer extent of the bumper frames 23 for disposition at an adjacent vehicle.

The dock plate 21 has opposite side edges 24 extending from the outer edge 22 to an inner edge 25 of the dock plate 21, at which roller sleeves 26 are mounted in the manner disclosed in the aforesaid Waddell U.S. Pat. No. 3,840,930, to facilitate movement of the inner edge 25 along the dock D during raising and lowering of the dockboard 20. A short shock plate 27 is secured to and extends from the roller sleeves 26 to form a short incline for equipment to move over onto the dock plate 21 without an abrupt shock as might occur in moving directly over the roller sleeves 26.

Figure 1:
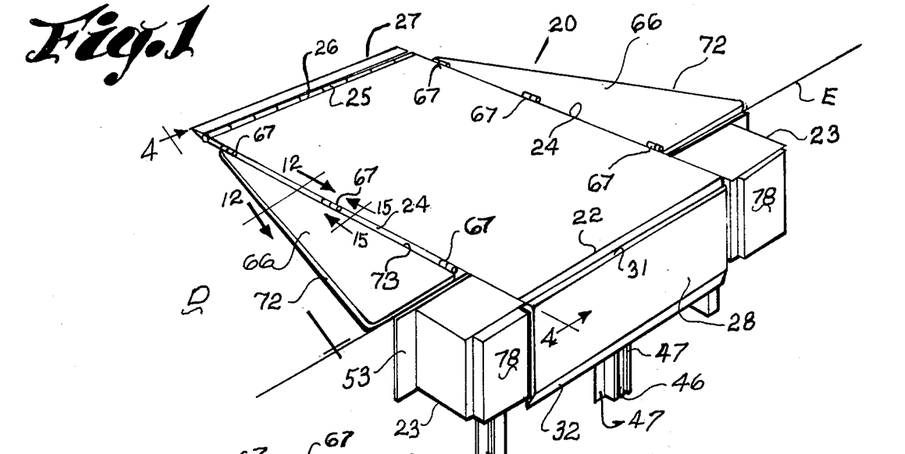
FIG. 1 is a perspective view of a dockboard according to the present invention shown in flat disposition on a dock.
Figure 2:
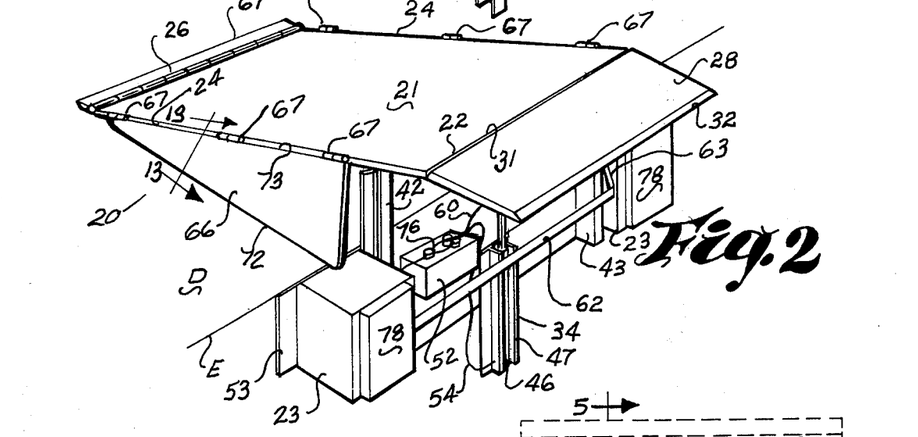
FIG. 2 is a perspective view of the dockboard in an inclined loading or unloading disposition.
Figure 3:
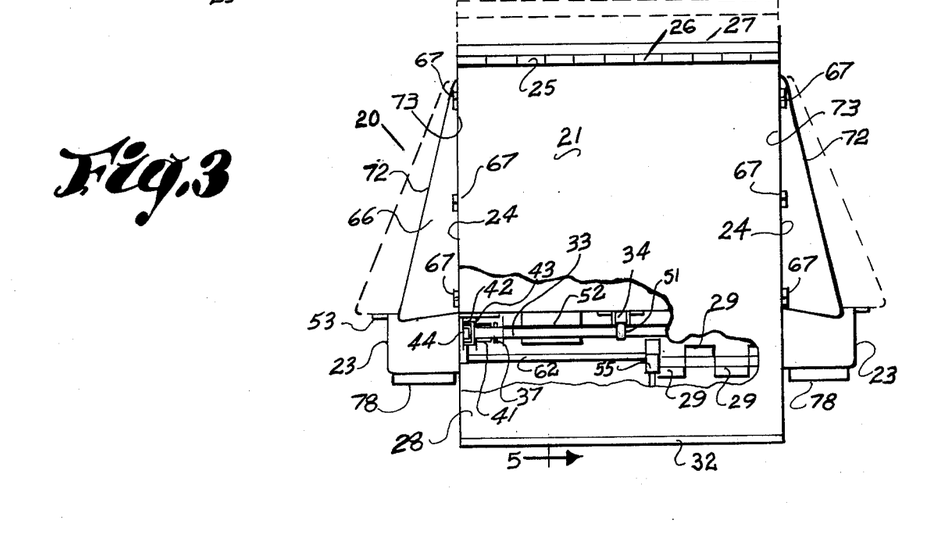
FIG. 3 is a plan view of the dockboard in the position of FIG. 2.
Figures 5, 6:
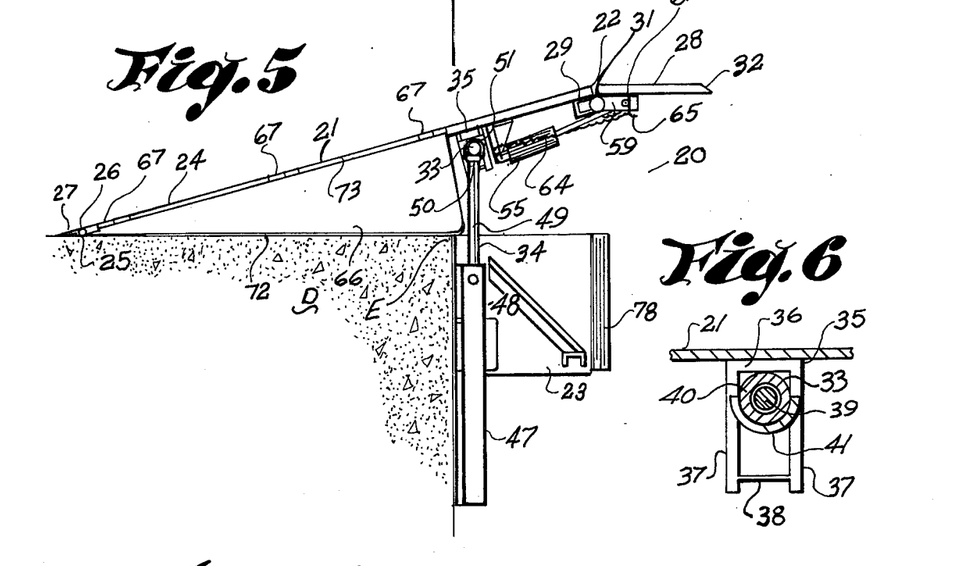
FIG. 5 is a vertical longitudinal sectional view of the dockboard in inclined loading or unloading disposition, taken along line 5—5 of FIG. 3.
FIG. 6 is an enlarged vertical sectional view of one of the supporting connections of the dockboard of the preceding figures.

At the outer edge 22 of the dock plate 21 a lip or truck plate 28 is hinged for movement from a vertical disposition out of vehicle interference (FIG. 1) to a generally horizontal disposition for support on an adjacent vehicle bed (FIG. 2). The hinge connection between the truck plate 28 and dock plate 21 consists of a series of hinge brackets 29 secured alternately to the undersides of the dock plate 21 and truck plate 28 and having aligned cylindrical bores through which a hinge pin 30 extends to connect the hinge brackets 29. These hinge brackets 29 are of sturdy construction and are securely attached to the dock plate 21 and truck plate 28, respectively, to provide full supporting connection therebetween, and they are secured to the respective plates in locations that result in abutment of the inner edge 31 of the truck plate 28 against the outer edge 22 of the dock plate 21 when the truck plate 28 is in a generally horizontal position (FIG. 5). This edge abutment and the sturdy bracket connection rigidifies the truck plate 28 with the dock plate 21 to form a single plate-like structure supported during loading or unloading of a vehicle only at the inner edge 25 of the dock plate 21 on the dock D and the outer edge 32 of the truck plate 28 on the adjacent vehicle bed.

The dock plate 21 is raised and lowered in a manner to cause the outer edge 22 to move in a generally vertical plane at the dock edge E without a substantially arcuate component of movement that would cause the outer edge 22 to move away from the vertical plane of the end of an adjacent vehicle bed. Thus, the truck plate 28 will be maintained in a disposition for extension over a vehicle bed regardless of the height to which the outer edge 22 of the dock plate 21 is raised. During this movement, the inner edge 25 of the dock plate 21 slides or rolls along the surface of the dock D to accommodate the resulting inclination of the dock plate 21. The dock plate is supported for this vertical movement on a cross bar 33 disposed under the dock plate 21 adjacent but spaced inwardly from the outer edge 22 of the dock plate 21. This cross bar 33 extends transversely for support of the dock plate 21 at opposite ends thereof and for connection to a piston-cylinder mechanism 34 centrally thereof to transmit vertical movement from the piston-cylinder mechanism 34 to the dock plate 21.

The connection of the cross bar 33 to the dock plate 21 is through a pair of support brackets 35 (FIGS. 6, 7 and 8) secured to the underside of the dock plate 21 adjacent the side edges 24 thereof in alignment with the cross bar 33. Each of these support brackets 35 includes a base 36 welded or otherwise secured to the underside of the dock plate and a pair of arms 37 secured to and projecting downwardly from the base 36 in spaced relation to allow the arms 37 to straddle the cross bar 33. These arms 37 extend downwardly a distance substantially greater than the vertical extent of the cross bar 33 so as to project downwardly substantially beyond the cross bar 33 (FIG. 6), thereby maintaining supported connection of the dock plate 21 on the cross bar 33 while allowing free floating relative movement therebetween to accommodate slight vertical or tilting movement of the dock plate 21 to conform with the bed of an adjacent vehicle as the bed shifts during loading or unloading. This support bracket construction also permits easy removal of the dock plate 21 from the cross bar 33; but to prevent inadvertent disengagement of the arms 37 from the cross bar 33, removable retaining pins 38 extend through and between the arms 37 of each pair adjacent their lower ends.

The cross bar 33 is constructed with a central shaft 39 around which a cylindrical sleeve 40 is disposed, with the outer diameter of the sleeve 40 being equivalent to or slightly less than the spacing between the support bracket arms 37 to allow supporting engagement therebetween. The ends of the cylindrical sleeve 40 are seated in arcuate support plates 41 that are secured to and project laterally inward from vertical guide posts 42 disposed at opposite ends of the cross bar 33 and adjacent and below the side edges 24 of the dock plate 21. The arcuate support plates 41 are spaced apart substantially equivalent to the outside spacing of the support brackets 35 on the dock plate 21 so that the support plates 41 not only support the cross bar 33 but also serve to maintain general stability of the dock plate 21 against lateral movement.

The aforementioned vertical guide posts 42 are channel shaped with the channels opening laterally outward for disposition in stationary vertical guide channels 43 secured to the dock D on the front face thereof below the edge E. These vertical guide channels 43 guide movement of the posts 42 in proper vertical alignment, and movement is further guided and facilitated by a pair of vertically spaced guide rollers 44 secured to and projecting inwardly from each bumper frame 23 into the facing guide posts 42. The upper of these guide rollers 44 is disposed below the level of the dock D so that the dock plate 21 can be lowered to flat dispostion on the dock D.

Figure 7:
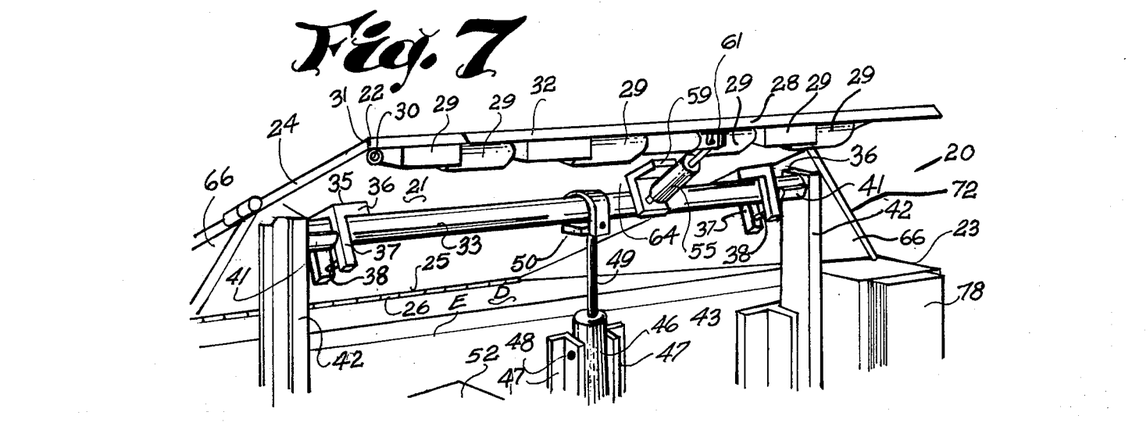
FIG. 7 is a front perspective view of the dockboard in inclined loading or unloading disposition.
Figure 8:
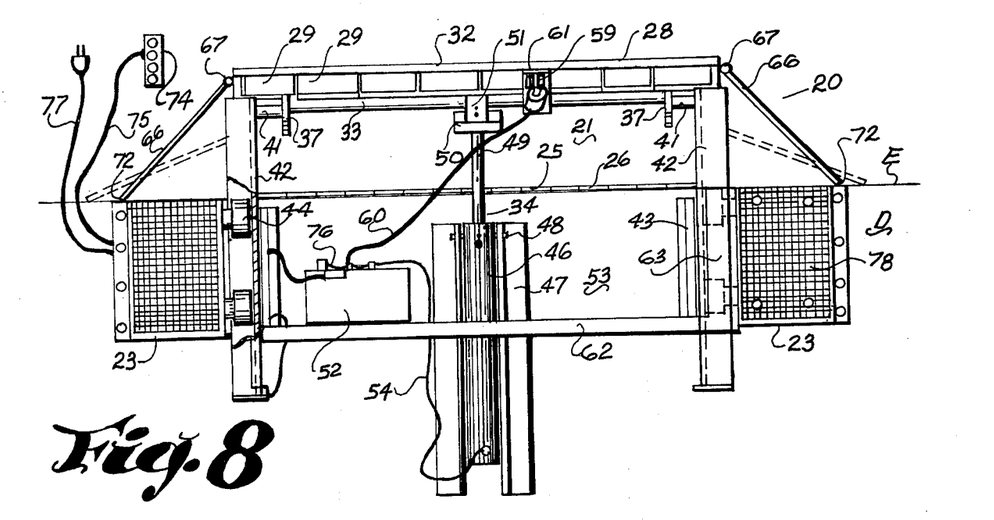
FIG. 8 is a front elevational view of the dockboard in inclined loading or unloading disposition and partially broken away to illustrate interior parts.

The aforementioned piston-cylinder mechanism 34 has a cylinder component 46 mounted between a pair of vertically extending angle members 47 that are secured to a back plate 53 mounted on the front face of the dock D centrally of the dockboard 20 and that project outwardly therefrom to provide a mounting for the cylinder component 46, which is secured thereto through horizontal pins 48 adjacent the upper end of the cylinder component 46 and supportingly projecting through the angle members 47. This pin support of the piston-cylinder mechanism 34 allows slight pivoting of the mechanism to accommodate any misalignment of the cross bar 33 with the mechanism that may occur during vertical movement thereof. The piston component 49 extends upwardly from the cylinder component 46 and has a plate 50 secured to its outer end for support of the cross bar 33 thereon, and a strap 51 is disposed over the cross bar 33 and has its ends secured to the plate 50 to secure the cross bar 33 to the piston component 49 (FIGS. 5 and 7).

The piston-cylinder mechanism 34 is hydraulically operated by an electrically driven pump 52 mounted on the back plate 53 that is secured to the face of the dock D and to which plate are mounted the bumper frames 23 and vertical guide channels 43. This pump 53 is located between the bumper frames 23 and inwardly of the truck plate 28, and is connected to the piston-cylinder mechanism 34 by a conduit 54 in a conventional manner.

The truck plate 28 is pivoted from its generally vertically hanging inoperative position to its generally horizontal operative disposition by truck plate engaging and pivoting means in the form of a linearly extendable and retractable piston-cylinder mechanism 55 that has an inner clevis end 56 pivotally secured to a bracket 57 that depends from the underside of the dock plate 21 immediately outward of the cross bar 33 and an outer clevis end 55 pivotally secured to a hinge link arm 59 that is hingedly secured to the hinge pin 30 at the outer edge 22 of the dock plate 21 for depending pivotable support therefrom so as to pivot generally coaxial with the truck plate pivoting. This hinge link arm 59 is located for stability near the center of the hinge pin 30.

The piston-cylinder mechanism 55 is hydraulically operated by the aforesaid pump 52 through a connecting conduit 60, and the extending action of the mechanism is transmitted to pivot the truck plate 28 through the hinge link arm 59, which has a transverse face plate 61 that is secured thereto for disengagable abutment against the underside of the truck plate 28. Extension of the mechanism 55 pivots the dock plate 28 to its generally horizontal operative position and, being disengagable from the truck plate, the mechanism 55 can be retracted while the truck plate 28 remains supported in operative position on the bed B of an adjacent vehicle V. This disengagement allows the truck plate 28 to freely conform to the vehicle bed as far as allowed by the dock plate connection, avoids application of any damaging shock or distortion loading of the mechanism through the truck plate during loading or unloading, and allows free fast dropping of the truck plate to its generally vertical inoperative position when the truck plate is released by movement of the vehicle away from the dock.

Figure 4:
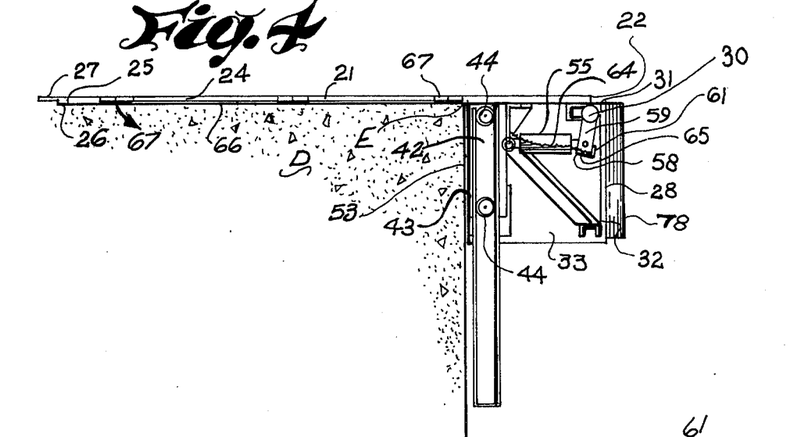
FIG. 4 is a vertical longitudinal sectional view of the dockboard in flat disposition, taken along line 4—4 of FIG. 1.

The location and the stroke of the linearly extendable and retractable mechanism 55 is such that in its retracted position (FIG. 4) it is inwardly retracted sufficiently to dispose the hinge link arm 59 inwardly beyond a vertical disposition out of truck plate engagement when the truck plate is in its vertical hanging inoperative position. Thus, when the truck plate drops from its operative position on a vehicle bed to its inoperative position it will not strike and possibly damage the pivoting mechanism and associated elements. This is further prevented positively by stop means in the form of a cross channel 62 secured to and extending between the bumper frames 23 in alignment with the inoperative position of the outer portion of the truck plate 28. The stop means also includes inwardly inclined channels 63 secured to the inside facing sides of the bumper frames 23 and extending from the cross channel 62 so that when the truck plate 28 drops when the dock plate 21 is in an elevated position it will be stopped against the inwardly inclined channels 62 before striking the hinge link arm face plate 61 and will slide down the inclined channels to and over the cross channel as the dock plate lowers to its inoperative position.

The extendable and retractable mechanism 55 is yieldably urged into its retracted position by means, such as a generally linearly acting coil spring 64 that extends around the bracket 57 and has its ends hooked on a finger 65 secured to and projecting from the face plate 61. This spring 64 retains the mechanism 55 retracted when inoperative and is yieldable to allow dock plate pivoting extension of the mechanism when powered by the pump 52.

Hinged to each side edge 24 of the dock plate 21 is a toe guard plate 66 that extends from adjacent the inner edge 25 of the dock plate 21 to the outer dock edge E and serves to obstruct access into the space between the dock plate 21 and the dock D when the dockboard 21 is elevated, thereby preventing accidental physical harm that otherwise could occur if a workman's foot or toe was accidentally under the dock plate 21 when it was lowered. Each of these toe guard plates 66 is connected to a side edge 24 of the dock plate 21 by three identical hinge connections 67 spaced along the adjacent edges. Each of these hinge connections (FIGS. 12-15) includes a cylindrical sleeve 68 welded to the toe guard plate 66 and an adjacent aligned cylindrical sleeve 69 welded to the dock plate side edge 24 with a hinge pin 70 extending through both of the sleeves 68, 69 and secured therein by a lock pin 71 extending through one of the sleeves 69. With this arrangement, the toe guard plates 66 are free to be disposed flat on the surface of the dock D when the dock plate 21 is similarly disposed flat and to pivot when the outer edge 22 of the dock plate 21 is raised to remain in dock engaging contact obstructing access to the space under the dock plate 21.

Each toe guard plate 66 is formed with a laterally outward dock contacting edge 72 that diverges forwardly away from the dock plate 21 to provide a generally triangular configuration to the toe guard plates 66. The dock contacting edges 72 extend angularly from the dock plate 21 along angular lines that extend from approximately the inner end of the side edges 24 of the dock plate 21 so that upon elevation of the outer edge 22 of the dock plate 21 with the inner edge 25 remaining on the dock D the toe guard plates 66 will pivot freely with the dock contacting edges 72 maintaining substantially full length contact with the dock D, and upon lowering of the dock plate 21 the dock contacting edges 72 will slide along the dock D until both the dock plate 21 and toe guard plates 66 are flat on the dock D.

So that the toe guard plates 66 will remain in a disposition capable of sliding along the dock D upon lowering of the dock plate 21 without binding, the hinge connections 67 for the toe guard plates 66 are constructed to limit the downward pivoting of the toe guard plates 66 to a downward inclination less than a vertical disposition, with an optimum limited disposition being approximately 45° from a horizontal disposition. This limitation to pivoting is provided by securing the toe guard plates 66 to the underside of the aforementioned sleeves 68 so that the inner edges 73 of the toe guard plates 66 will abut the side edges 24 of the dock plate 21 when the hinge plate has pivoted downwardly to the desired limit, such as 45°. As the dock plate 21 is then raised above a position at which the edge abutment occurs, the toe guard plates 66 will be prevented from further downward pivoting and will be raised out of dock contact. The dimensions of the toe guard plate 66 and the angle of the dock contacting edges 72 thereof are such that edge abutment will not occur at least until the dock plate 21 has been elevated above its normal maximum operating height so that dock contact will be maintained at this height. Movement sufficient to result in edge abutment and movement of the toe guard plates 66 out of dock contact may occur when the dock plate 21 is initially raised to a height above the operating height sufficient to allow the truck plate 28 to be elevated, but as this is only a temporary movement and the dock plate 21 immediately lowers into contact with the adjacent vehicle bed, there is little danger of an accident occurring during this short period of raising of the toe guard plates 66 from the dock D.

Operation of the dockboard 20 is controlled from a remote four button control box 74 held by an operator on the dock or ground adjacent the dockboard 20. This control box 74 is connected by an electrical conduit 75 to the valve system 76 on the pump 52 and the motor for the pump is electrically driven from a convenient source of electricity into which a connecting conduit 77 is connected.

Figures 9, 10:
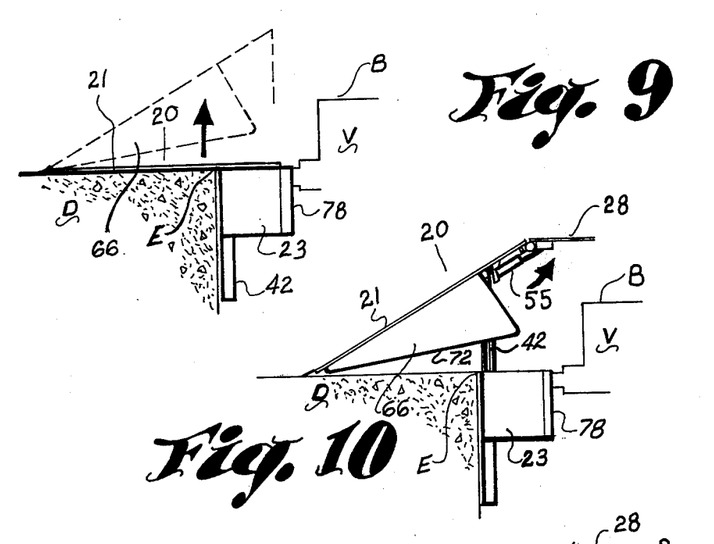
FIG. 9 is a diagrammatic side elevational view showing the dockboard in flat disposition in solid lines and showing in dotted lines the raised position prior to elevating the truck plate.
FIG. 10 is a view similar to FIG. 9 showing the dockboard raised and the truck plate elevated prior to lowering of the dockboard to loading or unloading disposition.
Figure 11:
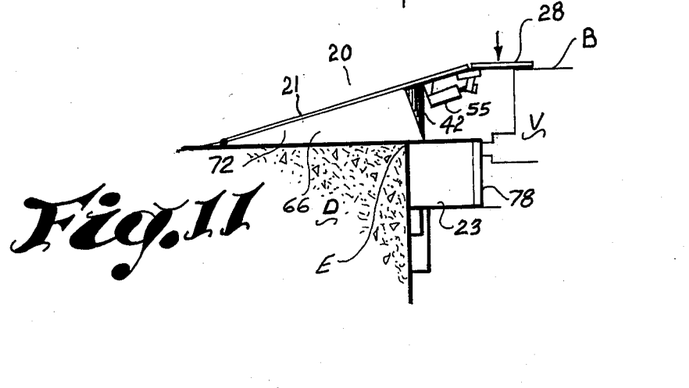
FIG. 11 is a view similar to FIGS. 9 and 10 showing the dockboard in loading or unloading disposition.
Figures 12, 13, 14:
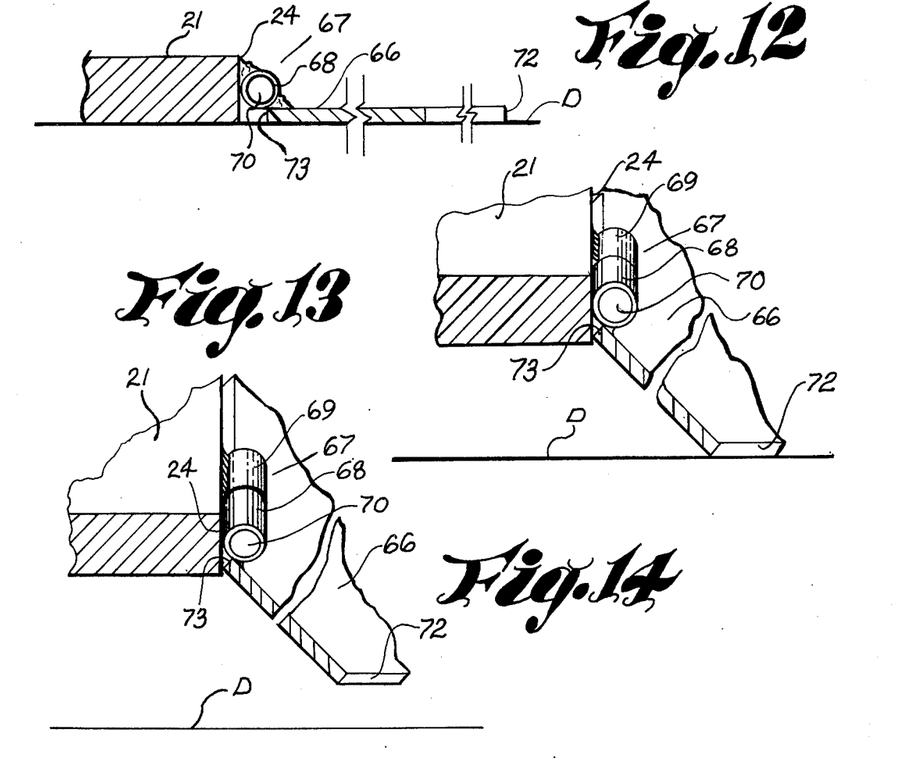
FIG. 12 is an enlarged vertical section of the hinge connection of the toe guard plate to the dock plate of the dockboard as viewed along line 12—12 of FIG. 1.
FIG. 13 is an enlarged vertical section of the hinge connection of the toe guard plate to the dock plate of the dockboard viewed along line 13—13 in FIG. 2.
FIG. 14 is a view similar to FIG. 13 illustrating the dockboard raised to an elevation as illustrated in FIG. 10.
Figure 15:
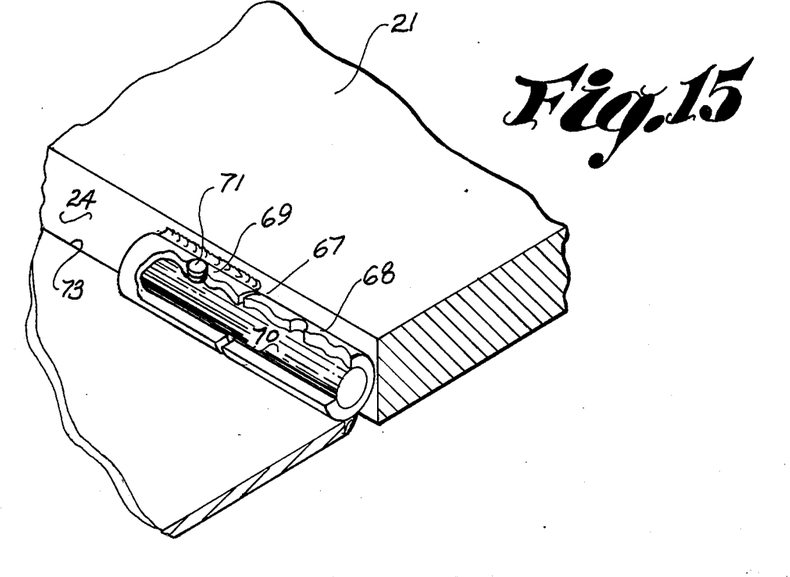
FIG. 15 is an enlarged perspective sectional view of the hinge connection of FIGS. 12-14 as taken along line 15—15 in FIG. 1.

The sequence of operation of the dockboard 20 is illustrated in FIGS. 9, 10 and 11. Starting with the dockboard in its inoperative position (solid lines in FIG. 9) with the dock plate 21 and toe guard plates 66 flat on the dock D and the truck plate 28 hanging vertically, a vehicle V is backed into position against bumper pads 78 on the faces of the bumper frames 23 to dispose the vehicle bed B at the dockboard. The operator then depresses the first button on the control box 74, which connects the pump 52 to the dock plate raising piston-cylinder mechanism 34, which raises the cross bar 33 and dock plate 21 thereat vertically while the truck plate 28 hangs vertically, rising past the level of the vehicle bed B without interference therewith (dotted lines in FIG. 9), and the toe guard plates 66 remaining in edge contact with the dock D until they reach their optimum inclination. When the first button is released the dockboard will remain in its raised position. The operator then depresses the second button on the control box 74, which causes actuation of the truck plate engaging and pivoting mechanism 55 to pivot the truck plate 28 to its generally horizontal operative position outwardly over the vehicle bed B (FIG. 10).

To avoid continued outward extension of the truck plate 28 in a position for possible damage when no vehicle is present, the valve system 76 is arranged to allow back flow from the truck plate pivoting mechanism 55 when the second button is not depressed, thereby allowing the truck plate to drift down with the coil spring 64 retracting the mechanism 55, preferably at about the same rate as the preceding extension. At the same time this retraction is starting, the operator depresses the third button to actuate the valve system 76 to lower the dockboard 20 until the truck plate 28 rests on the vehicle bed B at which time the toe guard plates 66 will be in edge contact with the dock D. The operator then releases the third button to permit the dockboard to remain in its loading or unloading position while the truck plate pivoting mechanism 55 continues to retract away from the truck plate 28 to a fully retracted position (FIG. 11). When the vehicle leaves the dockboard, the truck plate 28 will drop to its vertical inoperative position and the weight of the dock plate 21 will cause the dock plate raising mechanism 34 to drift downwardly with the toe guard plates sliding laterally outward on the dock D until the dock plate 21 and toe guard plates 66 are flat on the dock D in inoperative position. In the event a rapid drop of the dockboard 20 is desired for safety reasons or to avoid damage, the operator can depress the fourth button, which opens the valve system 76 to allow fast drop of the dock plate 21. During raising of the dockboard 20, during shifts in elevation of the dockboard 20 upon loading or unloading, during any tilting that may occur, and during lowering of the dockboard 20 to its inoperative position, both the inner edge 25 of the dock plate 21 and the outer edges 72 of the toe guard plates 66 slide on the dock D.

From the foregoing it is apparent that the present invention provides a safe, simple, inexpensive and efficient dockboard. Various modifications of the construction are contemplated within the scope of this invention, which is not intended to be limited to the detailed embodiment disclosed in the drawings and detailed description. The scope of the invention is understood to be defined only by the scope of the appended claims.

I claim:

1. A dockboard for use on a loading dock to provide a ramp between the dock and the platform of an adjacent vehicle, said dockboard comprising a dock plate having an outer edge disposed generally along the edge of the dock, an inner edge spaced from the dock edge, and side edges extending between the outer and inner edges, said dock plate being movable between a generally flat disposition at the level of said dock and an inclined disposition at which the outer edge is raised to a vehicle loading or unloading level and the inner edge is at the dock level, and toe guard plates hinged to said side edges of said dock plate and extending laterally therefrom for pivoting in relation thereto between a flat disposition on the dock when said dock plate is flat and a laterally inclined disposition maintaining edge contact with the dock when the dock plate is in an inclined loading or unloading disposition, thereby obstructing access laterally to the vertical space between the dock plate and dock.

2. A dockboard according to claim 1 and characterized further in that said toe guard plates have laterally outward dock contacting edges diverging forwardly away from said dock plate to maintain edge contact with said dock when said dock plate is in an inclined loading or unloading disposition.

3. A dockboard according to claim 2 and characterized further in that said dock contacting edge of each of said toe guard plates extends along at least a portion of a line that extends angularly from approximately the inner end of the side edge of said dock plate.

4. A dockboard according to claim 1 and characterized further in that said toe guard plates are hinged for edge sliding contact with said dock during at least a portion of the movement of said dock plate.

5. A dockboard according to claim 4 and characterized further in that pivoting of said toe guard plates is limited to a downward inclination less than a vertical disposition so that said toe guard plates will remain capable of outward sliding engagement with the dock upon lowering of said dock plate.

6. A dockboard according to claim 5 and characterized further in that pivoting of said toe guard plates is limited to a downward inclination of approximately 45°.

7. A dockboard according to claim 4 and characterized further in that the limiting of pivoting of said toe guard plates is provided by abutment of inner edges of said toe guard plates against the side edges of said dock plate.

8. A dockboard according to claim 1 and characterized further by means for supporting said dock plate during movement thereof to confine movement of the outer edge thereof in a generally vertical direction with the inner edge of the dock plate and laterally outward edges of said toe guard plates free to slide on said dock during dock plate movement.

9. A dockboard according to claim 8 and characterized further by a truck plate hingedly secured to said outer edge of said dock plate for pivoting between a hanging generally vertical inoperative position and an outwardly extending generally horizontal operative position, and means for engaging and pivoting said truck plate from its inoperative position to its operative position and being disengagable and retractable therefrom when the truck plate is supported in its operative position on an adjacent vehicle.

10. A dockboard according to claim 1 and characterized further by means for supporting said dock plate during movement thereof, said supporting means including a cross bar extending transversely under said dock plate adjacent said outer edge thereof, at least one pair of downwardly projecting arms secured to the underside of said dock plate and straddling said cross bar for support of said dock plate on said cross bar while allowing relative movement therebetween to accommodate slight vertical or tilting movement of said dock plate to conform with the bed of an adjacent vehicle during unloading or loading and permitting removal of said dock plate from said cross bar.

11. A dockboard according to claim 10 and characterized further in that said means for supporting said dock plate confines movement of said cross bar to a generally vertical direction to maintain movement of said outer edge of said dock plate generally vertical, with the inner edge of the dock plate and laterally outward edges of said toe guard plates free to slide on said dock during dock plate movement.

12. A dockboard for use on a loading dock to provide a ramp between the dock and the platform of an adjacent vehicle, said dockboard comprising a dock plate having an outer edge disposed generally along the edge of the dock and an inner edge spaced from the dock edge, said dock plate being movable between a generally flat disposition at the level of said dock and an inclined disposition at which the outer edge is raised to a vehicle loading or unloading level and the inner edge is at the dock level, means for supporting said dock plate during movement thereof including a cross bar extending transversely under said dock plate adjacent said outer thereof, and at least one pair of downwardly projecting arms secured to the underside of said dock plate and straddling said cross bar for support of said dock plate on said cross bar while allowing relative movement to accommodate slight vertical or tilting movement of said dock plate to conform with the bed of an adjacent vehicle during unloading or loading and to permit removal of said dock plate from said cross bar.

13. A dockboard according to claim 12 and characterized further in that said means for supporting said dock plate confines movement of said cross bar to a generally vertical direction to maintain movement of said outer edge of said dock plate generally vertical, with the inner edge of the dock plate free to slide on said dock during dock plate movement.

14. A dockboard according to claim 13 and characterized further in that said supporting means includes a pair of vertical guide posts supporting the opposite ends of said cross bar and vertical guide channels mounted on the dock below the surface thereof and disposed for retaining said guide posts therein for vertical movement.

15. A dockboard according to claim 14 and characterized further by means for moving said dock plate including a vertically disposed cylinder-piston mechanism mounted on the dock below the surface thereof and secured to said cross bar to impart vertical movement to said dock plate through said cross bar.

16. A dockboard according to claim 15 and characterized further in that said cylinder-piston mechanism is pivotally mounted to said dock to maintain proper operating alignment with said cross bar during movement thereof.

17. A dockboard according to claim 12 and characterized further by a truck plate hingedly secured to said outer edge of said dock plate for pivoting between a hanging generally vertical inoperative position and an outwardly extending generally horizontal operative position, and means for engaging and pivoting said truck plate from its inoperative position to its operative position and being disengagable and retractable therefrom when the truck plate is supported in its operative position on an adjacent vehicle.

18. A dockboard for use on a loading dock to provide a ramp between the dock and the platform of an adjacent vehicle, said dockboard comprising a dock plate having an outer edge disposed generally along the edge of the dock and an inner edge spaced from the dock edges, said dock plate being movable between a generally flat disposition at the level of said dock and an inclined disposition at which the outer edge is raised to a vehicle loading or unloading level and the inner edge is at the dock level, a truck plate hingedly secured to said outer edge of said dock plate for pivoting between a hanging generally vertical inoperative position and an outwardly extending generally horizontal operative position, and means for engaging and pivoting said truck plate from its inoperative position to its operative position and being disengagable and retractable therefrom when the truck plate is supported in its operative position on an adjacent vehicle, said truck plate engaging means including a linearly extendable and retractable mechanism extendable to pivot said truck plate to its operative position and retractable to disengage said engaging means for said truck plate, said mechanism including yieldable means for urging said mechanism to its retracted position and yieldably retaining said mechanism in said retracted position.

19. A dockboard according to claim 18 and characterized further in that said yieldable means is a generally linearly acting coil spring.

* * * * *

UNITED STATES PATENT OFFICE
CERTIFICATE OF CORRECTION

Patent No. 4,020,517　　　　　　　　Dated May 3, 1977

Inventor(s) Robert E. Waddell

It is certified that error appears in the above-identified patent and that said Letters Patent are hereby corrected as shown below:

Column 2, line 2, of the Abstract, "unloadng" should read --- unloading ---.

Column 2, line 10, "edged" should read -- edges ---.
Column 3, line 65, after "dockboard" should read --- as ---.
Column 11, line 9, after "outer" should read --- edge ---.

Signed and Sealed this sixteenth Day of August 1977

[SEAL]

Attest:

RUTH C. MASON
*Attesting Officer*

C. MARSHALL DANN
*Commissioner of Patents and Trademarks*